Sept. 27, 1932.  H. W. JONES  1,879,623
BATTERY BOX
Filed June 12, 1930
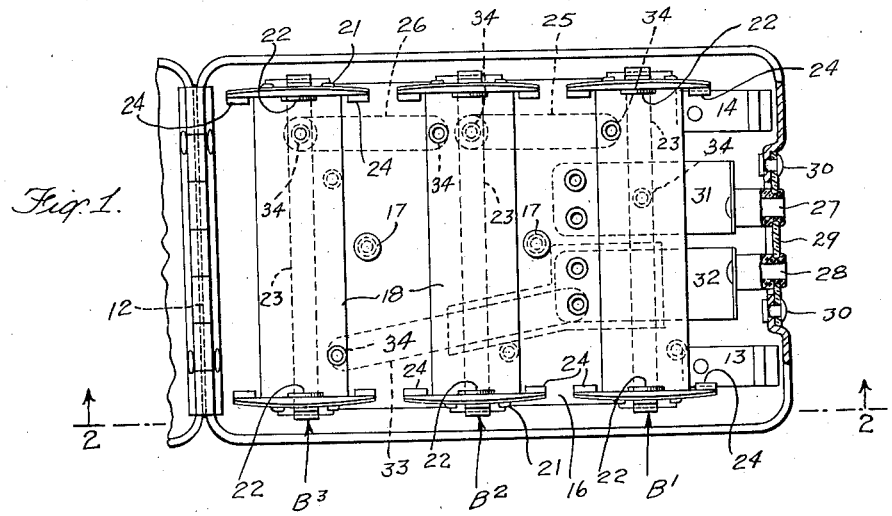
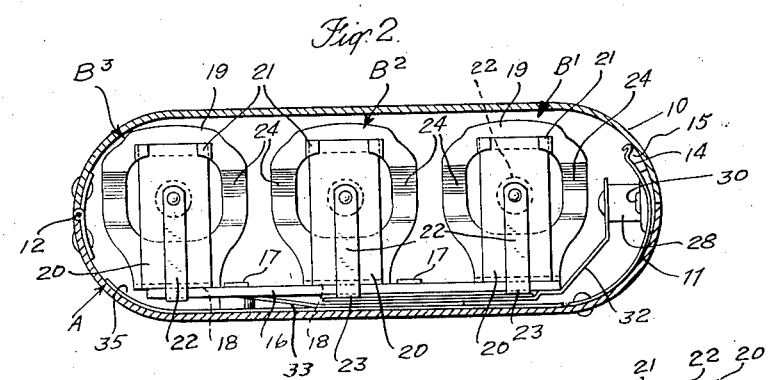
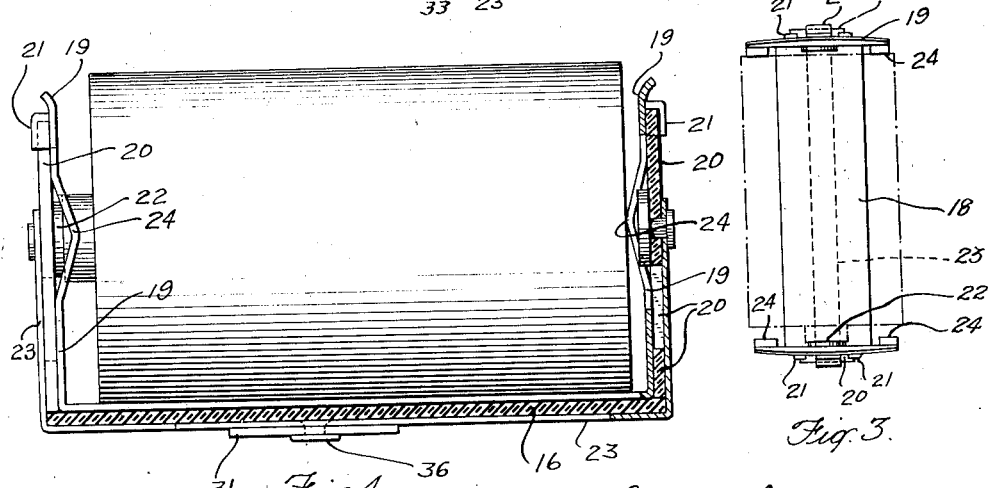
Homer W. Jones, INVENTOR,
BY
Byrnes, Townsend & Potter, ATTORNEYS.

Patented Sept. 27, 1932

1,879,623

UNITED STATES PATENT OFFICE

HOMER W. JONES, OF WILLIAMSVILLE, NEW YORK, ASSIGNOR TO NATIONAL CARBON COMPANY, INC., A CORPORATION OF NEW YORK

BATTERY BOX

Application filed June 12, 1930. Serial No. 460,753.

This invention pertains to battery boxes in general and in particular to a battery box having polarity determining clips for holding individual battery cells and for connecting such cells in a circuit in series aiding position regardless of the relative position of the cells in the clips.

The polarity determining contact clips of the present invention are an improvement on those disclosed by L. J. Voorhees in patent application bearing Serial Number 277,837, and the chief object is to provide improved clips of this general type that are less likely to short circuit the battery cells inserted therein. Other aims, objects, and novel features, will be apparent from the following description and the accompanying illustration, in which:

Fig. 1 is a top view of my improved battery box with the cover in open position to show the cell clips;

Fig. 2 is a sectional view of the same along line 2—2 of Fig. 1;

Fig. 3 is the top view of an isolated clip with a cell therein, and;

Fig. 4 is a side view of the same.

The preferred form of the invention shown in the accompanying drawing comprises a casing A having complementary portions 10 and 11 joined at one end by a hinge 12, and resiliently held together at the other end by springs 13 and 14 carried by section 11 so the outer ends thereof snap over the interior lugs 15 on section 10.

Within the casing A three cell clips B are carried by a sheet 16 of insulating material such as Celeron that is attached to the lower portion 11 of the casing A by rivets 17.

Each cell clip B comprises a suitably formed sheet 18 of flexible metal having upturned ends 19 suitably spaced to receive a battery cell therebetween. The central portion of each upturned end 19 is provided with an opening therein over the outside of which a support 20 of insulating material such as fiber is held by a plurality of ears 21 formed in the upturned end 19 so one ear surrounds each edge of the sheet 20. Carried by each of the sheets 20 is a contact 22 having a body or stem extending through the insulation 20 and riveted to a sheet metal conductor 23 extending around under the insulating sheet 16 and then up to the contact 22 at the other end of the clip B. The central portion 24 of each upturned end 19 is bent inward beyond the inner face of contact 22 so that when a battery cell is inserted in the clip the flat bottom will make connection with the inturned portions 24 at one end of the clip and the central carbon electrode of the cell will make connection with contact 22 at the other end of the clip regardless of which end of the cell is placed toward a certain end of the clip. As contacts 24 are represented at each end of the clip, and those at one end of the clip are electrically connected to those at the other end it follows that the bottom of the cell or negative electrode will always make connection with the inturned portions 24. Also, as a contact 22 is provided at each end of each clip B, and as they are electrically connected, it follows that they will always make connection with the central carbon or positive electrode of the cell.

Contacts 24 of clip B—1 are electrically connected to contacts 22 of clip B—2 by conductor 25, and contacts 24 of clip B—2 are electrically connected to contacts 22 of clip B—3 by conductor 26. Electric current is led from the battery box by terminals 27 and 28 carried by an insulator 29 that is attached to the lower portion 11 of the casing A by rivets 30. Terminal 27 is connected to the conductor 23 of clip B—1 by a metal strip 31, and terminal 28 is electrically connected to body 18 of clip B—3 by sheet metal conductors 32 and 33. Conductors 25, 26, 31, 32 and 33, lie on the under side of the insulation 16 and are mechanically held in place and electrically connected to their respective conductors above the insulation by rivets 34. A thin sheet of insulating material 35 such as paper is interposed between these conductors and the lower section 11 of casing A to prevent electrical contact therebetween.

The cell contacts 22 and 24 of each of the clips B are relatively positioned and arranged so a battery cell is electrically connected in circuit in a predetermined polarity regardless of which end of the cell is toward one end of the clip. The spaced contacts 24 are represented at each end of the clip and those at one end are electrically connected with those at the other end. Also, contact 22 is represented at each end of the clip and they are also electrically connected. Each contact 22 is located between two contacts 24 at one end of the clip, and contat 22 is positioned back of the contacts 24 so the flat bottom of a battery cell makes connection only with contacts 24 and the protruding central electrode of a battery cell makes connection only with contact 22. Therefore, regardless of which way a battery cell is inserted in a clip the electrical connection between the cell and the clip will be made between the bottom of the cell and contacts 24 at one end of the clip, and the central electrode of the cell and contact 22 at the other end of the clip. In view of these facts it follows that by connecting the clips as already described the battery cells inserted therein will be connected in circuit in series aiding position regardless of the relative position of any cell in its respective clip.

With a battery cell in each of the clips B the electrical circuit through the battery box A is from terminal 27, through conductor 31, rivet 34, conductor 23 of clip B—1, contact 22 of clip B—1, the cell in clip B—1, contacts 24 of clip B—1, rivet 34, conductor 25, rivet 34, conductor 23 of clip B—2, contact 22 of clip B—2, the cell in clip B—2, contacts 24 of clip B—2, rivet 34, conductor 26, rivet 34, conductor 23 of clip B—3, contact 22 of clip B—3, the cell in clip B—3, contacts 24 of clip B—3, rivet 34, conductor 33, and conductor 32, to terminal 28.

It is understood that various changes in the form and arrangement of the component parts may be made, and equivalent materials may be substituted for those specified, without departing from the scope of the invention or sacrificing any of the rights thereunder.

I claim:

1. In a battery box; a plurality of battery cell clips adapted for holding a plurality of cells and connecting them in circuit; each of said clips having upturned ends adapted to receive a battery cell therebetween; each of said upturned ends having an opening therein and a contact at each side thereof adapted for making connection with the negative terminal of said cell when the cell is inserted in said clip in one position; an insulating member carried by said upturned end and extending across said opening; a contact carried by said insulating member in said opening outside of said negative contacts and adapted to make contact with the positive terminal of said cell when the cell is inserted in said clip in another position; and means for electrically connecting each contact at one end of each clip with a like contact at the other end thereof.

2. In a battery box; a plurality of battery cell clips; each of said clips having upturned ends adapted for receiving a battery cell therebetween; each of said upturned ends having an opening therein, an inwardly bent contact at each side thereof, and two ears on the outside thereof; an insulating member held to the outside of said end by said ears; a contact carried by said insulating member in said opening outside of said first-mentioned contacts; means for electrically connecting each contact at one end of each clip with a like contact at the other end thereof; and means for electrically connecting the clips in series.

In testimony whereof, I affix my signature.

HOMER W. JONES.